(12) United States Patent
Kubat

(10) Patent No.: US 8,554,947 B1
(45) Date of Patent: Oct. 8, 2013

(54) NETWORK DATA TRANSMISSION SYSTEMS AND METHODS

(75) Inventor: Peter Kubat, Sudbury, MA (US)

(73) Assignee: Verizon Laboratories Inc., Waltham, MA (US)

( * ) Notice: Subject to any disclaimer, the term of this patent is extended or adjusted under 35 U.S.C. 154(b) by 2167 days.

(21) Appl. No.: 10/662,764

(22) Filed: Sep. 15, 2003

(51) Int. Cl.
*G06F 15/173* (2006.01)

(52) U.S. Cl.
USPC ............................................. 709/239

(58) Field of Classification Search
USPC ................................................ 709/238–244
See application file for complete search history.

(56) References Cited

U.S. PATENT DOCUMENTS

| | | | | |
|---|---|---|---|---|
| 5,091,877 A * | 2/1992 | Itoh et al. | | 709/217 |
| 5,717,796 A * | 2/1998 | Clendening | | 385/24 |
| 5,742,765 A * | 4/1998 | Wong et al. | | 709/230 |
| 5,838,924 A * | 11/1998 | Anderson et al. | | 709/239 |
| 5,986,783 A * | 11/1999 | Sharma et al. | | 398/59 |
| 6,047,331 A * | 4/2000 | Medard et al. | | 709/239 |
| 6,202,082 B1 * | 3/2001 | Tomizawa et al. | | 709/201 |
| 6,259,837 B1 * | 7/2001 | de Boer et al. | | 385/24 |
| 6,477,142 B1 * | 11/2002 | Remein | | 370/222 |
| 6,598,092 B2 * | 7/2003 | Tomizawa et al. | | 709/251 |
| 6,606,667 B1 * | 8/2003 | Hermann | | 709/239 |
| 6,721,268 B1 * | 4/2004 | Ohira et al. | | 370/223 |
| 6,725,401 B1 * | 4/2004 | Lindhorst-Ko | | 714/47.3 |
| 6,850,486 B2 * | 2/2005 | Saleh et al. | | 370/218 |
| 6,853,641 B2 * | 2/2005 | Lindhorst-Ko et al. | | 370/394 |
| 6,895,441 B1 * | 5/2005 | Shabtay et al. | | 709/238 |
| 6,947,377 B1 * | 9/2005 | Shimano et al. | | 370/228 |
| 7,209,975 B1 * | 4/2007 | Zang et al. | | 709/238 |
| 7,237,035 B1 * | 6/2007 | Damle | | 709/236 |
| 7,398,321 B2 * | 7/2008 | Qiao et al. | | 709/239 |
| 7,490,165 B1 * | 2/2009 | Katukam et al. | | 709/239 |
| 7,853,715 B1 * | 12/2010 | Katukam et al. | | 709/239 |
| 2002/0049608 A1 * | 4/2002 | Hartsell et al. | | 705/1 |
| 2002/0049841 A1 * | 4/2002 | Johnson et al. | | 709/225 |
| 2002/0075873 A1 * | 6/2002 | Lindhorst-Ko et al. | | 370/394 |
| 2002/0172149 A1 * | 11/2002 | Kinoshita et al. | | 370/216 |
| 2002/0176131 A1 * | 11/2002 | Walters et al. | | 359/118 |
| 2002/0188756 A1 * | 12/2002 | Weil et al. | | 709/240 |
| 2002/0194339 A1 * | 12/2002 | Lin et al. | | 709/226 |
| 2003/0005165 A1 * | 1/2003 | Langridge et al. | | 709/251 |
| 2003/0009582 A1 * | 1/2003 | Qiao et al. | | 709/233 |
| 2003/0031124 A1 * | 2/2003 | Chow et al. | | 370/216 |
| 2003/0065815 A1 * | 4/2003 | Klink | | 709/239 |
| 2003/0126287 A1 * | 7/2003 | Charny et al. | | 709/239 |
| 2003/0126299 A1 * | 7/2003 | Shah-Heydari | | 709/252 |
| 2003/0214962 A1 * | 11/2003 | Allaye-Chan et al. | | 370/406 |
| 2004/0093399 A1 * | 5/2004 | Knebel et al. | | 709/221 |
| 2004/0114595 A1 * | 6/2004 | Doukai | | 370/389 |
| 2004/0184402 A1 * | 9/2004 | Alicherry et al. | | 370/216 |
| 2004/0193728 A1 * | 9/2004 | Doshi et al. | | 709/238 |
| 2005/0002329 A1 * | 1/2005 | Luft et al. | | 370/222 |

OTHER PUBLICATIONS

Robert Trost, Bit Error Rate Monitoring for a Sonet/SDH Framer Apr. 1, 2001, pp. 8-12.*

* cited by examiner

*Primary Examiner* — Rupal Dharia
*Assistant Examiner* — Marcus McKenzie

(57) ABSTRACT

Network data transmission systems and methods are described. In one embodiment, a method for transmitting data between two nodes of a network can include transmitting the data using a protection bandwidth of a first transmission path between the two nodes and, based on detecting a failure condition in the first transmission path, using a different second transmission path between the two nodes to transmit the data otherwise transmitted using the protection bandwidth of the first transmission path. In one embodiment, the systems and methods can be applied to networks that use a layer-1 redundancy scheme.

35 Claims, 10 Drawing Sheets

NETWORK DATA TRANSMISSION SYSTEMS AND METHODS

BACKGROUND

During transmission of data between two or more nodes of a network, loss of data due to transmission or other network failures can be a consideration. A redundancy scheme can be used when such failure conditions arise. As provided herein, a "failure condition" can refer to situations in which transmitted data is not properly received and can include a faulty reception (e.g. a failure to satisfy a cyclic redundancy check (CRC), a failure to satisfy a signal-to-noise ratio (SNR) threshold, a failure to receive data, etc.), and/or a network failure (e.g. a network component failure, etc.).

One type of redundancy scheme is a layer-1 redundancy scheme, in which the term "layer-1" refers to the first layer in the Open Systems Interconnection Reference Model (OSI-RM). (References herein to "layer-n" refer to the nth layer of the OSI-RM.) In a layer-1 redundancy scheme, a network bandwidth can be allocated between a working bandwidth and a protection bandwidth. A working bandwidth can refer to a bandwidth used to transmit data, and a protection bandwidth can refer to a bandwidth that can be used when a working bandwidth experiences a failure condition. A data transmission scheme that includes a layer-1 redundancy scheme lacks efficiency in its use of the network bandwidth, thereby inhibiting its utility.

SUMMARY

Methods for transmitting data between two nodes of a network are described. In one embodiment, the methods can include transmitting the data using a protection bandwidth of a first transmission path between the two nodes, and, based on detecting a failure condition in the first transmission path, using a different second transmission path between the two nodes to transmit the data otherwise transmitted using the protection bandwidth of the first transmission path.

The network can include a transport network, such as a synchronous optical network (SONET).

The first transmission path can include a configuration based on one or more of bidirectional path switched rings (BPSRs), bidirectional line switched rings (BLSRs), linear protection systems, point-to-point 1+1 protection systems, and point-to-point 1:1 protection systems.

In one embodiment, the methods can further include detecting a failure condition in the first transmission path.

Detecting a failure condition in the first transmission path can include detecting a failure condition in the first transmission path based on a layer-1 protocol and/or a non-layer-1 protocol. The layer-1 protocol can include a SONET protocol. The non-layer-1 protocol can include a layer-2 protocol and/or a layer-3 protocol. The non-layer-1 protocol can include a multi-protocol label switching (MPLS) protocol and/or a resilient packet rings (RPR) protocol.

Detecting a failure condition in the first transmission path can include detecting a loss of a signal, a loss of a frame, a line alarm, and/or an error rate greater than a signal degradation threshold. The error rate can include at least one of a line bit error rate and a path bit error rate.

Detecting a failure condition in the first transmission path can also include detecting a failure condition in a working bandwidth and/or a protection bandwidth. Detecting a failure condition in the working bandwidth can include detecting a failure condition based on a layer-1-protocol and/or a non-layer-1 protocol. Detecting a failure condition in the protection bandwidth can include detecting a failure condition based only on a non-layer-1 protocol.

For the disclosed systems and methods, using a different second transmission path can include using the different second transmission path to transmit the data otherwise transmitted using the protection bandwidth of the first transmission path at a time approximately 50 ms later than a time associated with the detected failure condition.

In one embodiment, the methods can further include determining the different second transmission path based on a non-layer-1 protocol.

The network can include a two optical-fiber configuration, and for the disclosed systems and methods, using the different second transmission path can include using the different second transmission path based on detecting a failure in one or more of a working bandwidth and a protection bandwidth of the first transmission path.

The network can include a four optical-fiber configuration, and for the disclosed systems and methods, using the different second transmission path can include using the different second transmission path based on detecting a failure in a protection bandwidth of the first transmission path.

Also described are processor programs for transmitting data between two nodes of a network. The processor programs can be stored on a processor readable medium. In one embodiment, the processor programs can include instructions to cause a processor to: transmit data using a protection bandwidth of a first transmission path between the two nodes, and, based on detecting a failure condition in the first transmission path, use a different second transmission path between the two nodes to transmit the data otherwise transmitted using the protection bandwidth of the first transmission path.

Also described are systems for transmitting data between two nodes of a network. In one embodiment, the systems can include at least two switches connected to the network and configured to: transmit data using a protection bandwidth of a first transmission path between the two nodes, and, based on detecting a failure condition in the first transmission path, use a different second transmission path between the two nodes to transmit the data otherwise transmitted using the protection bandwidth of the first transmission path.

Also described are networks that can include a synchronous optical network (SONET) and at least two data switches connected to the SONET and configured to: transmit data using a protection bandwidth of a first transmission path between the two switches, and, based on detecting a failure condition in the first transmission path, use a different second transmission path between the two switches to transmit the data otherwise transmitted using the protection bandwidth of the first transmission path.

These and other features of the systems and methods described herein can be more fully understood by referring to the following detailed description and accompanying drawings.

DETAILED DESCRIPTION

Figure 1A:
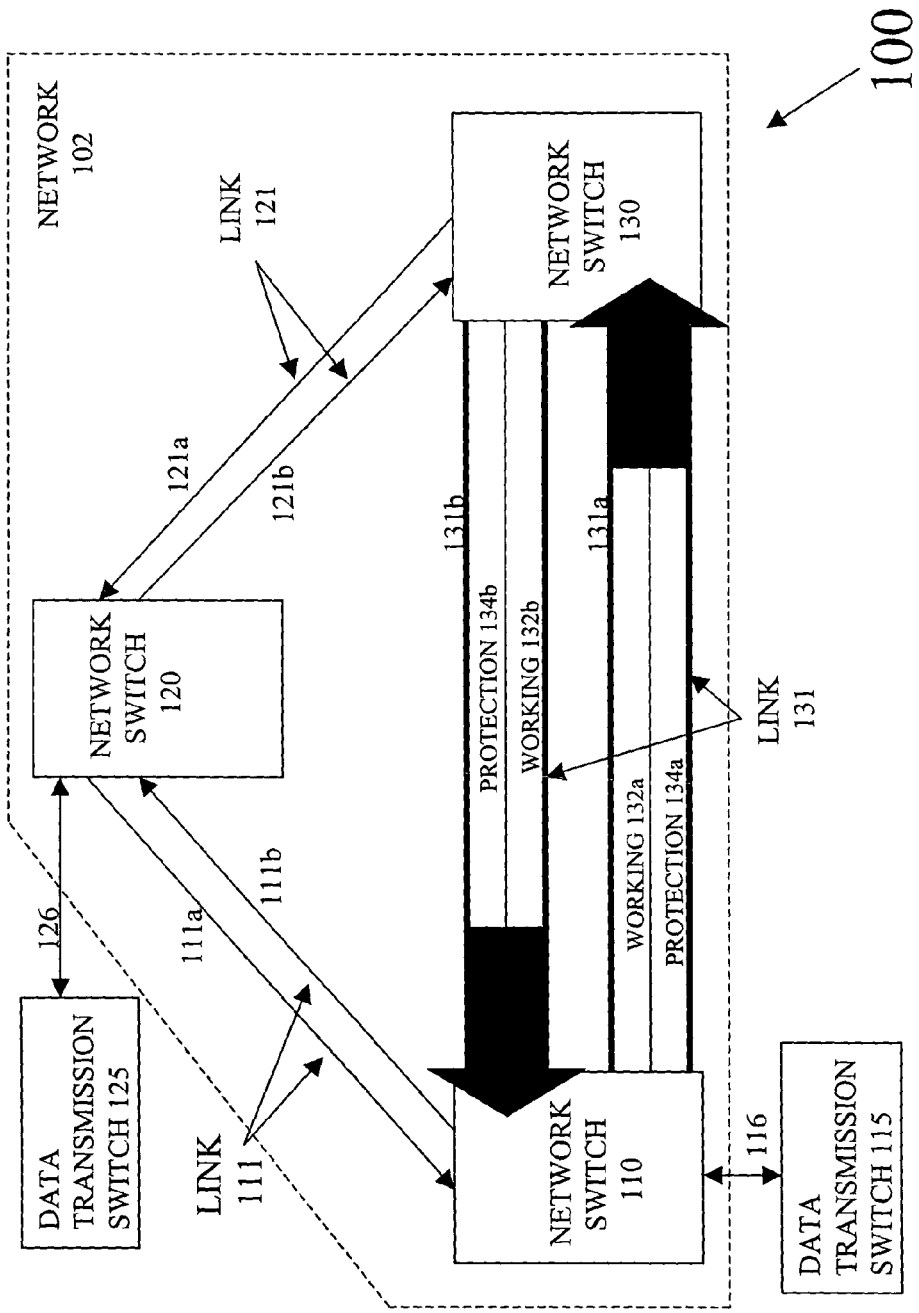
FIGS. 1A-1C schematically illustrate an exemplary data transmission system that can transmit data using a protection bandwidth of a layer-1 redundancy scheme.

Illustrative embodiments will now be described to provide an overall understanding of the network data transmission systems and methods described herein. One or more examples of the illustrative embodiments are shown in the drawings. Those of ordinary skill in the art will understand that the systems and methods described herein can be adapted and modified to provide devices, methods, schemes, and systems for other applications, and that other additions and modifications can be made to the systems and methods described herein without departing from the scope of the present disclosure. For example, aspects, components, features, and/or modules of the illustrative embodiments can be combined, separated, interchanged, and/or rearranged to generate other embodiments. Such modifications and variations are intended to be included within the scope of the present disclosure.

The disclosed systems and methods relate to transmitting data between first and second nodes using a protection bandwidth of a first transmission path. When a failure condition is detected in the first transmission path, the data otherwise transmitted using the protection bandwidth of the first transmission path can be transmitted using a different second transmission path.

As will be understood by those of ordinary skill in the art, nodes can be understood as network connection points and can include, for example, switches, routers, and other devices. As such, references herein to switches can be more generally understood to be references to nodes.

As will also be understood by those of ordinary skill in the art, a transmission path can be understood as a vector path between two or more nodes. A transmission path can include a protection bandwidth (in the direction of the vector path) and an associated working bandwidth (also in the direction of the vector path).

Figure 4:
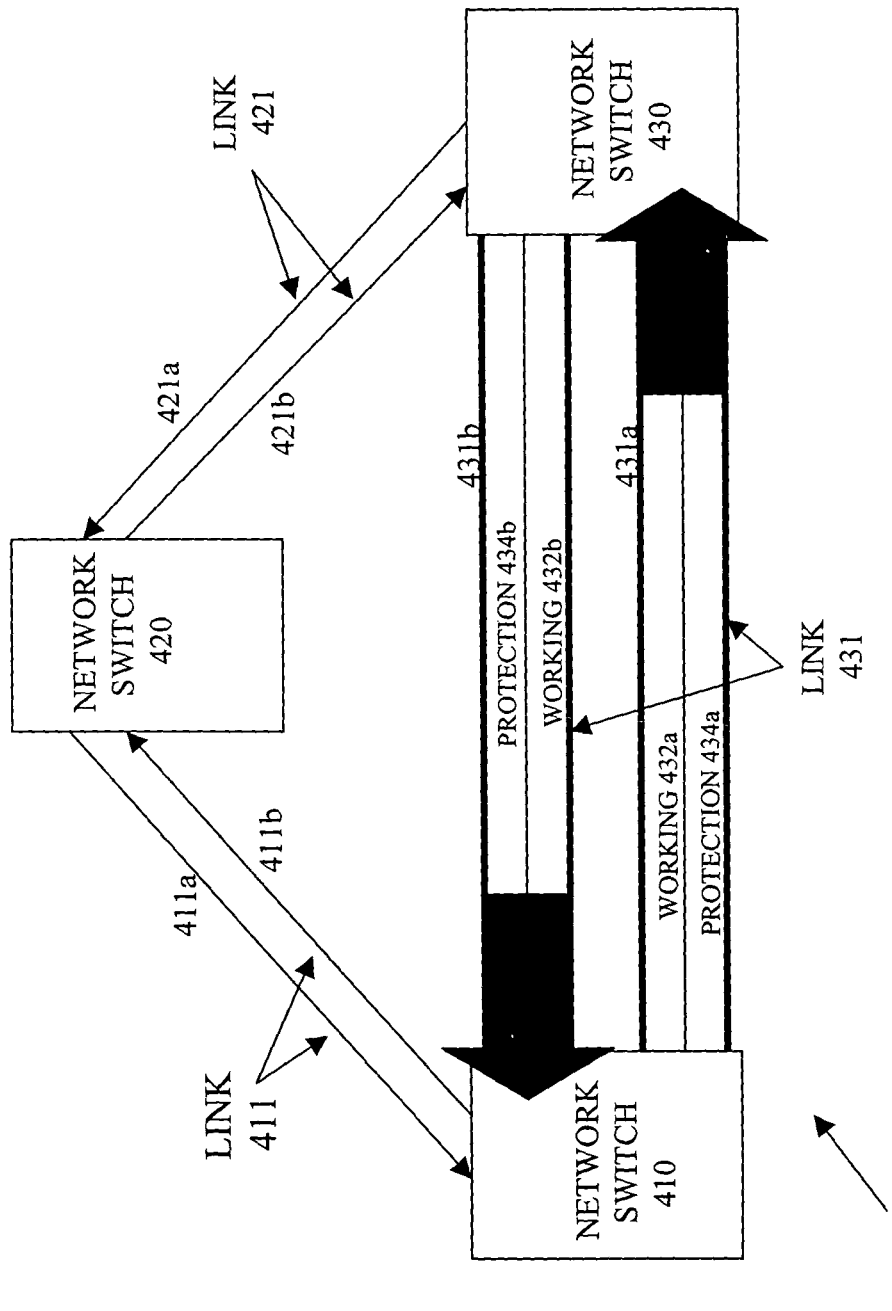
FIG. 4 schematically illustrates a data transmission system that includes a layer-1 redundancy scheme.

FIG. 4 schematically illustrates a data transmission system that includes a layer-1 redundancy scheme. As shown in FIG. 4, the data transmission system 400 can include network switches 410, 420, 430 (and/or other network components, e.g. routers, etc.) connected by data communications links 411, 421, 431. The data communications links 411, 421, 431 can be wired or wireless and can include optical fibers. As shown in FIG. 4, the data communication links 411, 421, 431 can include first and second optical fibers for transmitting data in opposite directions (shown in FIG. 4 for link 431, for example, as 431a, 431b) in which half of the bandwidth of each of such first and second optical fibers 431a, 431b can be allocated to working bandwidths 432a, 432b and protection bandwidths 434a, 434b. This allocation is schematically illustrated in FIG. 4 for the first and second fibers 431a, 431b of link 431. Those of ordinary skill in the art will understand that the bandwidths of links 411 and 421 can be similarly allocated to working and protection bandwidths. During operation, the network switches 410, 420, 430 can transmit data using the working bandwidths (such as the working bandwidths 432a, 432b) between the switches. Based on detecting a failure condition in a working bandwidth to a destination switch, an origination switch can use allocated protection bandwidth(s) between the origination switch and switch(es) other than the destination switch to transmit the data otherwise transmitted using the working bandwidth in the absence of the failure condition.

Figure 5A:
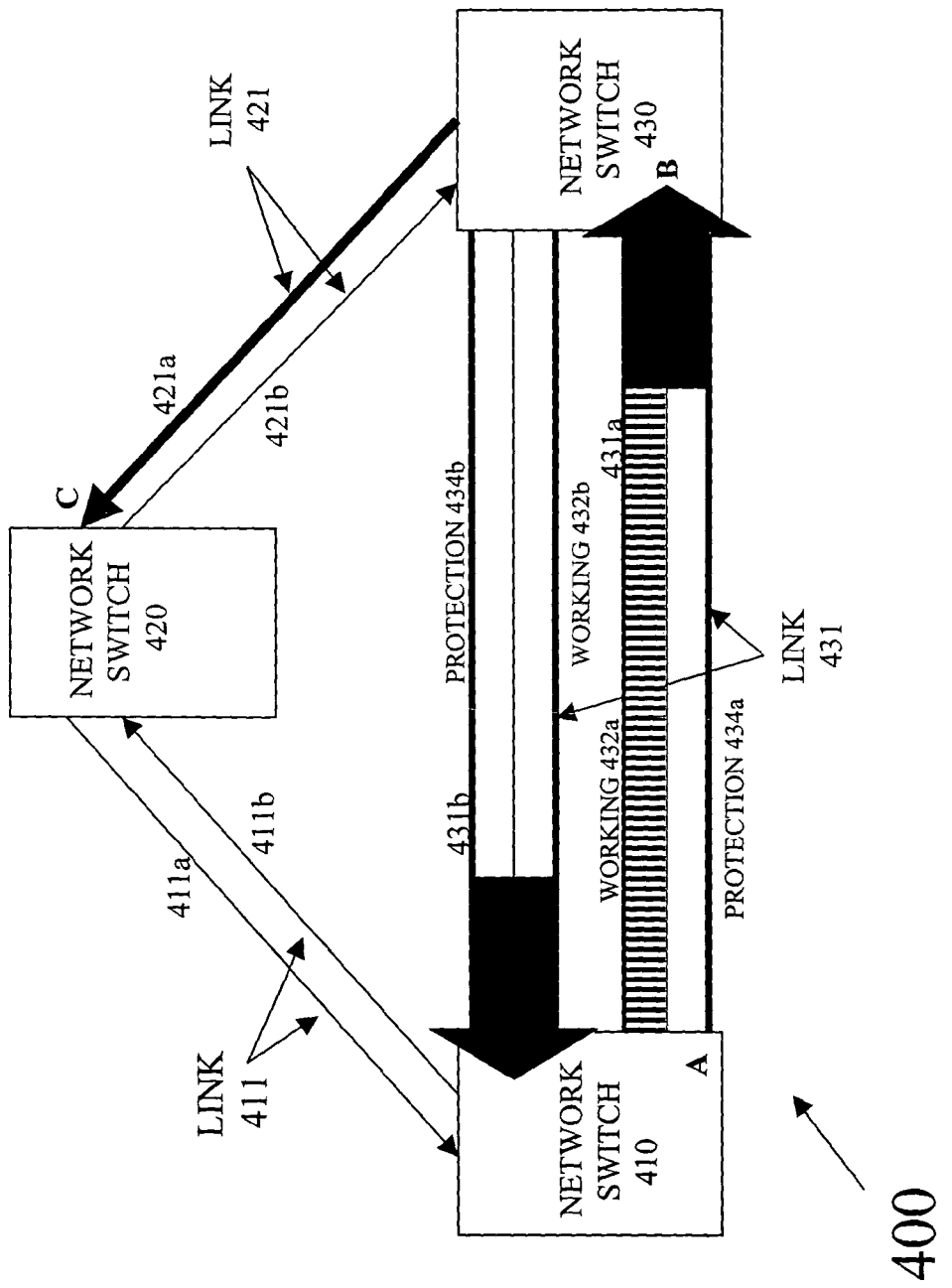
FIGS. 5A-5B schematically illustrate an operation of a data transmission system according to FIG. 4.
Figure 5B:
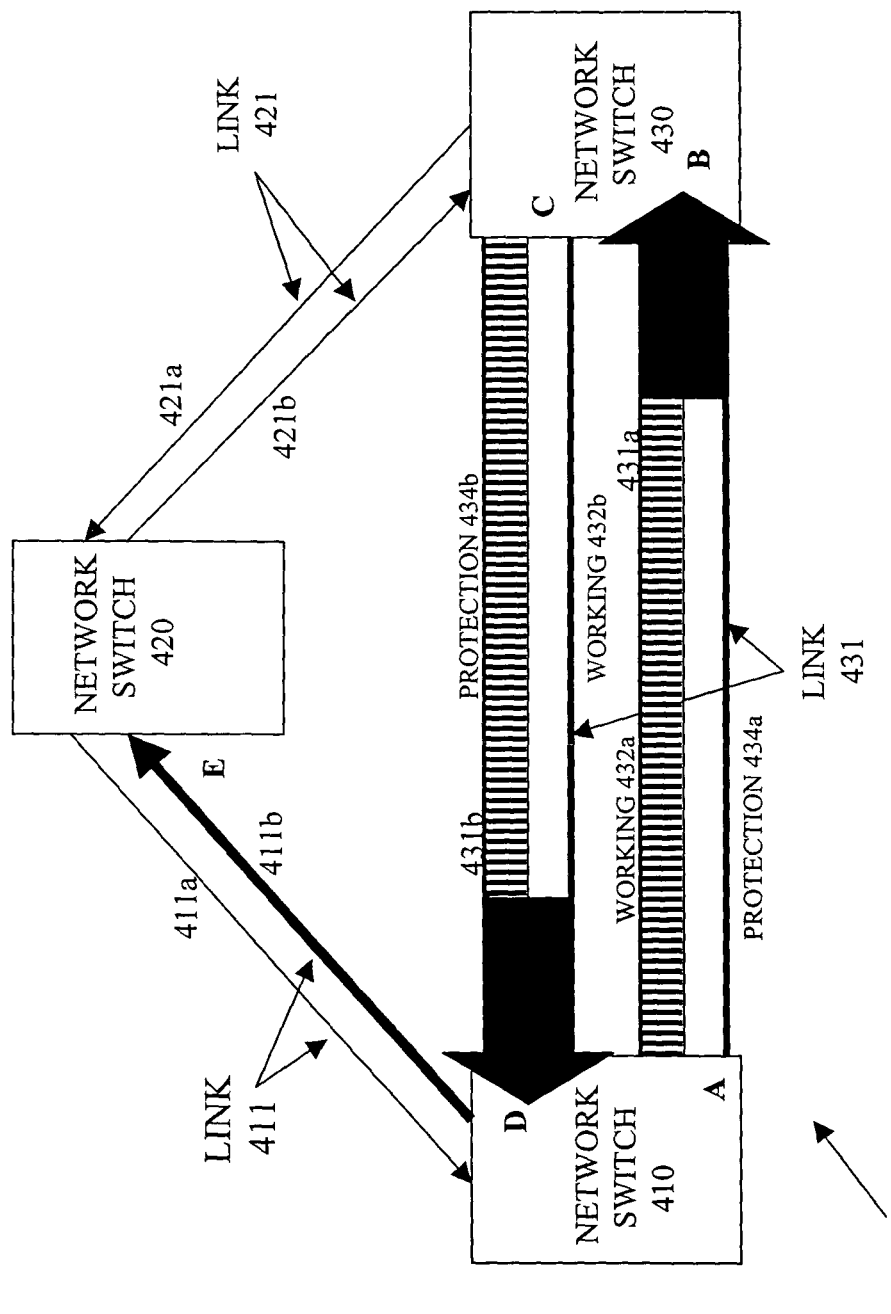

FIGS. 5A-5B schematically illustrate an operation of a data transmission system according to FIG. 4. As shown in FIG. 5A and with reference to FIG. 4, a first network switch 410 can transmit data to a second network switch 420 using link 431 and link 421 along path A-B-C, i.e. using the working bandwidth 432a of the first optical fiber 431a associated with link 431 and the working bandwidth of the first optical fiber 421a associated with link 421. As shown in FIG. 5B, based on detecting a failure in the first optical fiber 421a, the network switch 430 can use the protection bandwidth 434b of the second optical fiber 431b associated with link 431 to transmit along path C-D-E the data otherwise transmitted using the working bandwidth of the first optical fiber 421a associated with link 421.

Figure 1B:
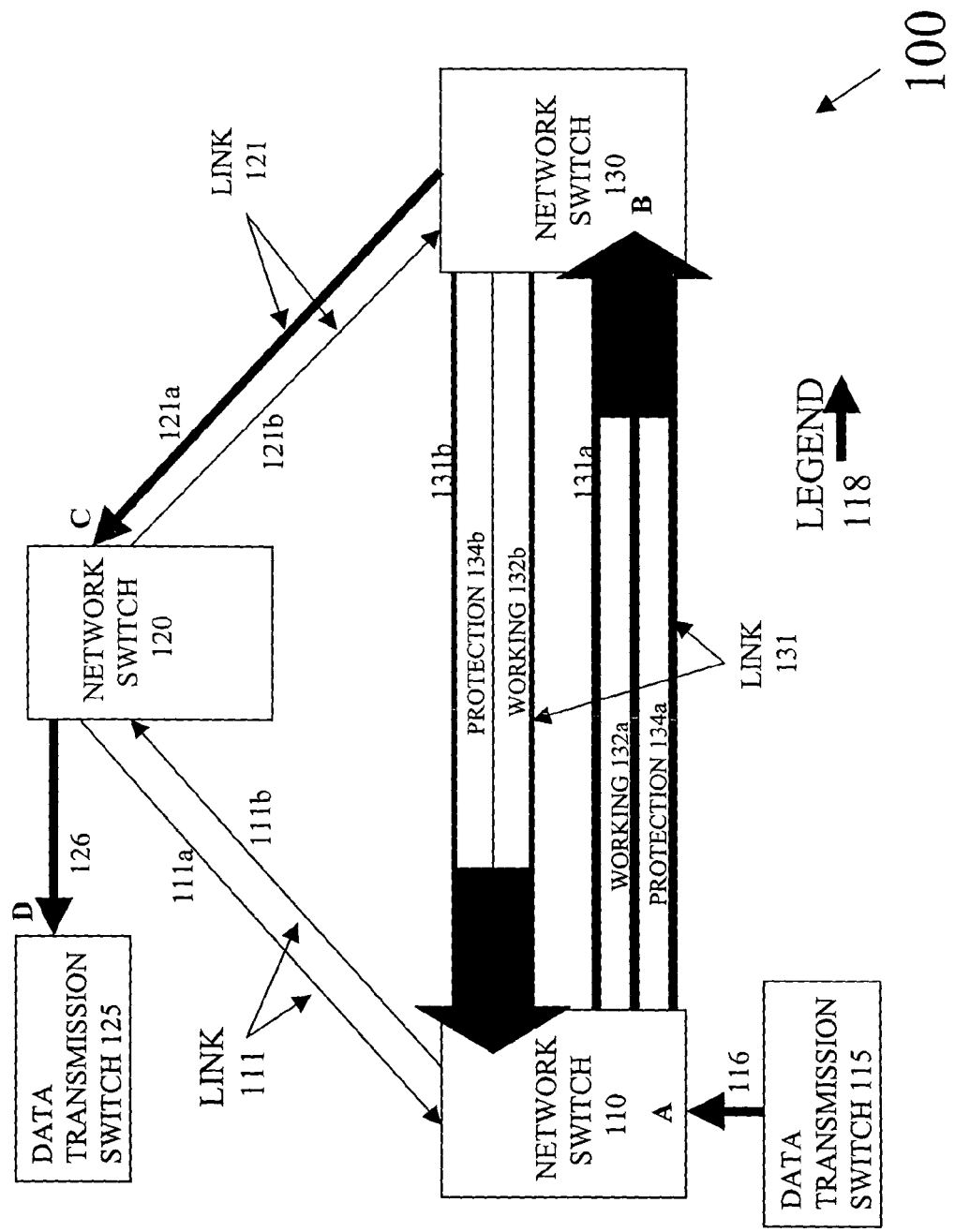
Figure 1C:
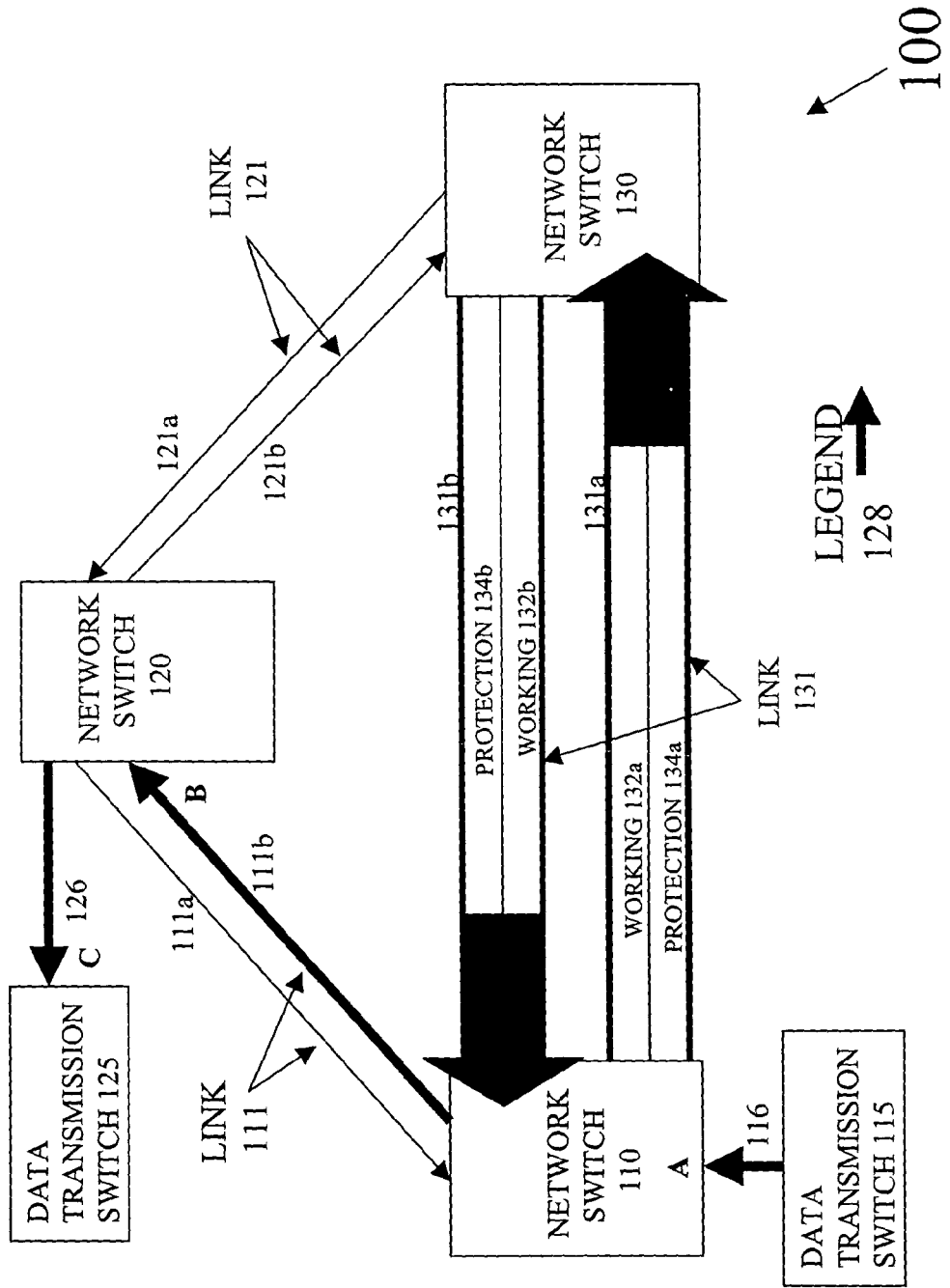

FIGS. 1A-1C schematically illustrate a data transmission system that can transmit data using a protection bandwidth of, for example, a layer-1 redundancy scheme. As shown in FIG. 1A, a data transmission system 100 can include first and second data transmission switches 115, 125 connected to a network 102 by data communication links 116, 126 similar to those previously described herein. Network 102 can include a layer-1 redundancy scheme similar to that previously described herein with respect to FIGS. 4 and 5A-5B. The first and second data transmission switches 115, 125 can be configured to transmit data using one or more of the protection bandwidths (shown in FIGS. 1A-1C for link 131 as 134a, 134b) of the illustrated network 102. Those of ordinary skill in the art will understand that the first and second data transmission switches 115, 125 may not be configured for layer-1 operation and may be configured for operation at a different OSI-RM layer.

In embodiments, the first and second data transmission switches 115, 125 can be configured to transmit data using a transmission path that can include the protection bandwidths of one or more data communication links. For example, as shown in FIG. 1B, a first transmission path 118 (denoted in FIG. 1B as the A-B-C-D path) can include the data communication links 116 and 126, the protection bandwidth of link 131 in the A-B direction (i.e., the protection bandwidth 134a of optical fiber 131a), and the protection bandwidth of link 121 in the B-C direction (i.e., the protection bandwidth of optical fiber 121a). Also for example, as shown in FIG. 1C, a different second transmission path 128 (denoted in FIG. 1C as the A-B-C path) can include data communication links 116 and 126 and the protection bandwidth of link 111 in the A-B direction (i.e. the protection bandwidth of fiber 111b). Other transmission paths will be evident to those of ordinary skill in the art.

In the disclosed embodiments, the first and second data transmission switches 115, 125 can be configured to detect and/or otherwise recognize a failure condition in a transmission path, such as the aforementioned first and second transmission paths of FIGS. 1B and 1C. A failure condition in a transmission path can include a layer-1 and/or a non-layer-1 failure condition. For example, a failure condition can include a loss of a signal, a loss of a frame, a line alarm, an error rate (e.g. a line bit error rate or a path bit error rate) greater than a signal degradation threshold, and/or a failure condition as previously described herein, with such examples provided for illustration and not limitation. In one embodiment, the first and second data transmission switches 115, 125 can be configured to detect a failure condition in a transmission path based on a layer-1 protocol (e.g. a synchronous optical network (SONET) protocol) and/or a non-layer-1 protocol, such as a layer-2 and/or a layer-3 protocol (e.g. a resilient packet rings (RPR) protocol and/or a multi-protocol label switching (MPLS) protocol).

In one embodiment, the first and second data transmission switches 115, 125 can be configured to detect a failure condition in a working bandwidth of a transmission path based on a layer-1 or non-layer 1 protocol. For example, in one such embodiment, the first and second data transmission switches 115, 125 can be configured to detect a failure condition in the working bandwidth 132a of optical fiber 131a of link 131 based on a SONET, an RPR, and/or an MPLS protocol.

In one embodiment, the first and second data transmission switches 115, 125 can be configured to detect a failure condition in a protection bandwidth based only on a non-layer-1 protocol. For example, in one such embodiment, the first and second data transmission switches 115, 125 can be configured to detect a failure condition in the protection bandwidth 134a of optical fiber 131a of link 131 based on an RPR and/or an MPLS protocol.

Based on detecting a failure in a current transmission path, the first and/or second data transmission switches 115, 125 can be configured to determine and/or otherwise be provided with one or more "different" transmission paths to transmit data to a desired destination. A "different" transmission path can refer to a path that does not include a detected failure condition. As provided herein, a "different" transmission path can include at least one different data communication link (e.g. links 111, 121, 131). In one embodiment, the first and second data transmission switches 115, 125 can determine the different transmission path(s) based on a non-layer-1 protocol, such as a layer-2 and/or a layer-3 protocol (e.g. an RPR and/or an MPLS protocol).

In embodiments, based on detecting a failure condition in a first transmission path, the first and second data transmission switches 115, 125 can be configured to determine or otherwise be provided with a second different transmission path(s) to transmit the data otherwise transmitted using the protection bandwidth of the first transmission path. In one embodiment, based on detecting a failure in a working bandwidth and/or a protection bandwidth of the first transmission path, the first and second data transmission switches 115, 125 can be configured to determine or otherwise be provided with a second different transmission path(s) to transmit the data otherwise transmitted using the protection bandwidth of the first transmission path. In one embodiment, based on detecting a failure in a protection bandwidth of the first transmission path, the first and second data transmission switches 115, 125 can be configured to determine or otherwise be provided with a second different transmission path(s) to transmit the data otherwise transmitted using the protection bandwidth of the first transmission path.

In some embodiments, the data transmission switches 115, 125 can be configured to use the different transmission path to transmit data at a time approximately 50 ms later than a time associated with a detected failure condition of the first transmission path. For example, based on a non-layer-1 protocol, such as a layer-2 and/or a layer-3 protocol (e.g. an RPR and/or an MPLS protocol), the data transmission switches 115, 125 can be configured to transmit data after a time delay of, for example, 50 ms after the time of the detected failure condition, although other time delays can be used.

In one exemplary operation of a data transmission system 100 provided herein, a network 102 can include a SONET network, the network switches 110-130 can include add/drop multiplexers (ADMs), the data transmission switches 115, 125 can include RPR and/or MPLS switches, and each of the data communication links 111, 116, 121, 126, 131 can include two optical fibers for transmitting data in opposite directions. Those of ordinary skill in the art will understand that the exemplary operations described herein are to be interpreted in an illustrative and non-limiting manner and that different operations of the data transmission systems described herein are within the scope of the present disclosure.

Figure 2A:
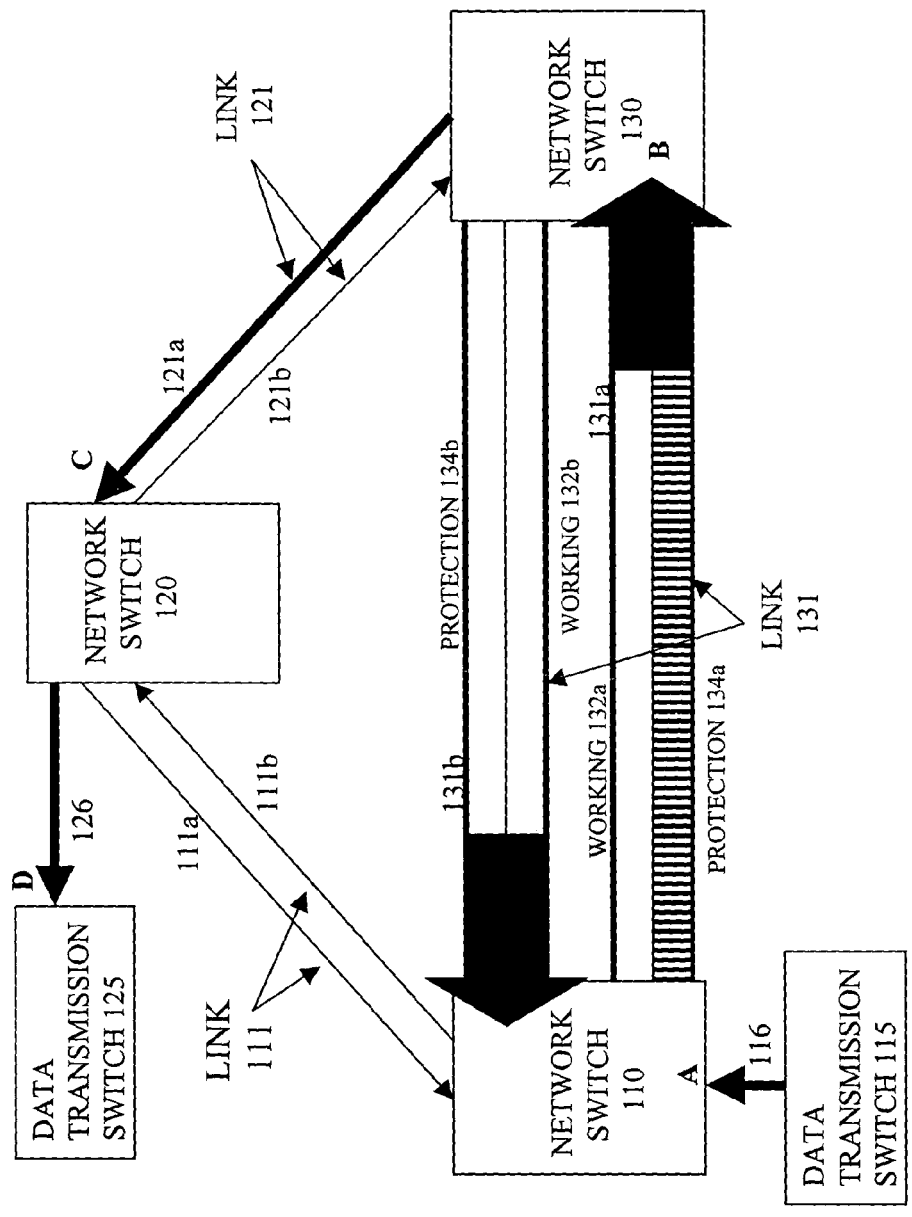
FIGS. 2A-2B and 3A-3B schematically illustrate exemplary operations for data transmission systems according to FIGS. 1A-1C.
Figure 2B:
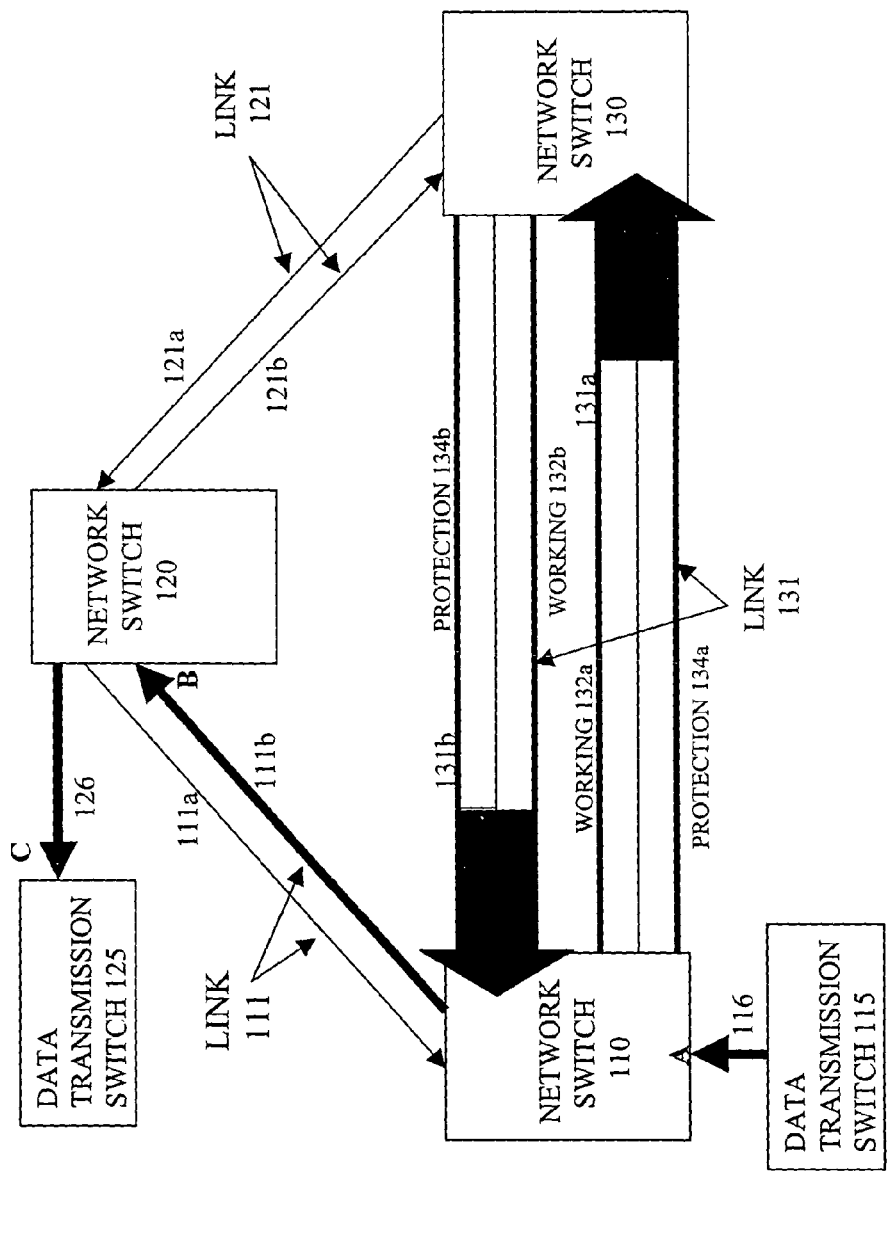

FIGS. 2A-2B schematically illustrate one operation of the data transmission system 100 for transmitting data between the first and second data transmission switches 115, 125 using a first transmission path 118 (shown in FIG. 2A as the A-B-C-D path) and a different second transmission path 128 (shown in FIG. 2B as the A-B-C path). As previously described herein, the first transmission path can include data communication links 116 and 126 and the protection bandwidth 134a of optical fiber 131a of link 131 and the protection bandwidth of optical fiber 121a of link 121; and, the second different transmission path 128 can include data communication links 116 and 126 and the protection bandwidth of optical fiber 111b of link 111.

As shown in FIG. 2A, and with reference to FIGS. 1A-1C, the first data transmission switch 115 can transmit data to the second data transmission switch 125 (and vice-versa) using one or more of the protection bandwidths of the first transmission path 118 (labeled A-B-C-D in FIG. 2A). As shown in FIG. 2B, and with reference to FIGS. 1A-1C, based on detecting a failure condition in the first transmission path 118, for example, in the optical fiber 121a (e.g. based on detecting a failure condition in the working bandwidth and/or the protection bandwidth associated with the optical fiber 121a), the first data transmission switch 115 can employ a different, second transmission path 128 to transmit the data otherwise transmitted using the protection bandwidths of the optical fibers 131a, 121a of the first transmission path 118. As shown in FIG. 2B, the data otherwise (e.g. absent a failure condition) transmitted using the protection bandwidth of the first transmission path 118 (labeled path A-B-C-D in FIG. 2A) can be transmitted using the protection bandwidth of the second, different transmission path 128 (labeled path A-B-C in FIG. 2B).

As will be understood by those of skill in the art, the data transmission switches 115, 125 can be configured to operate on a time scale similar to the time scale of the network switches 110, 120, 130. In one embodiment, the data transmission switches 115, 125 can be configured to operate on a time scale substantially faster than that of the network switches 110, 120, 130.

As described herein, a failure condition can be detected in the working bandwidth and/or the protection bandwidth of the optical fiber 121a, and, thus, regardless of whether the failure condition is associated with the working bandwidth and/or the protection bandwidth, the protection bandwidth(s) of the different second transmission path 128 can be used to transmit all of the data otherwise transmitted on the protection bandwidths of the optical fibers 131a, 121a of the first transmission path 118.

In one exemplary operation of a data transmission system 100 provided herein, a network 102 can include a SONET network, the network switches 110-130 can include add/drop multiplexers (ADMs), the data transmission switches 115, 125 can include RPR and/or MPLS switches, and each of the data communication links 111, 116, 121, 126, 131 can include two pairs of two optical fibers, in which each pair transmits data in opposite directions. Those of ordinary skill in the art will understand that the exemplary operations described herein are to be interpreted in an illustrative and non-limiting manner and that different operations of the data transmission systems described herein are within the scope of the present disclosure.

Figure 3A:
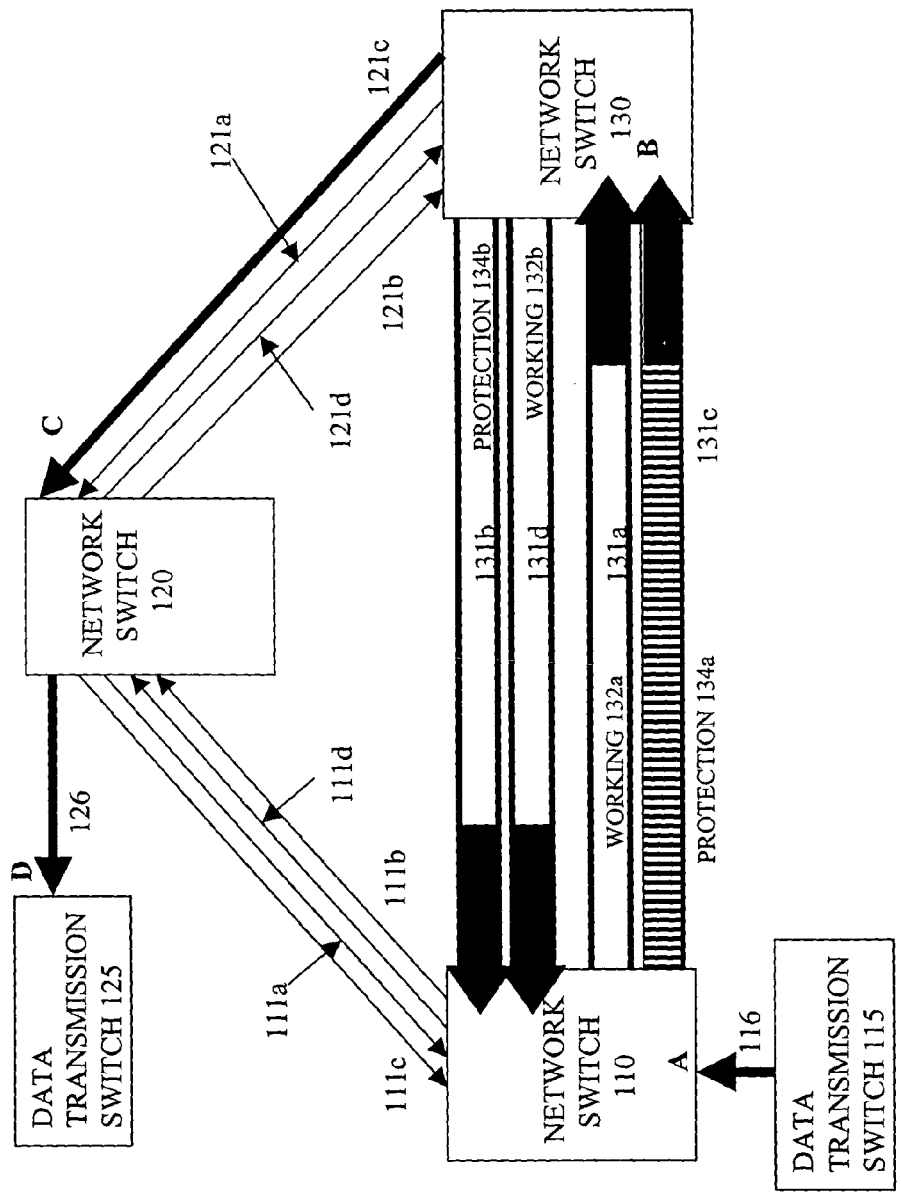
Figure 3B:
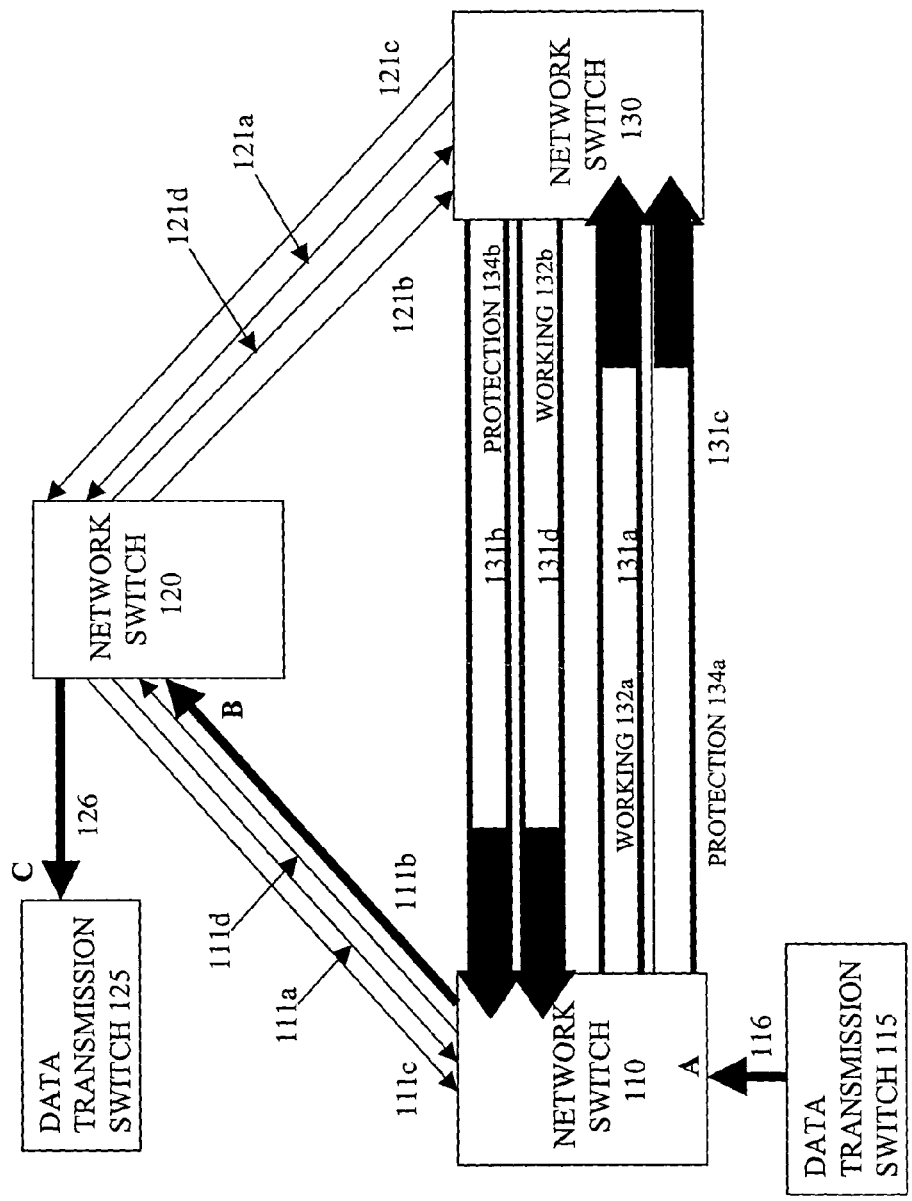

FIGS. 3A-3C schematically illustrate another operation of the data transmission system 100 for transmitting data between the first and second data transmission switches 115, 125 using a first transmission path 118 and a different second transmission path 128. The first transmission path 118 and the second transmission path 128 can be understood as previously described herein. As shown in FIG. 3A and with reference to FIGS. 1A-1C, in the FIG. 3A embodiment, the first transmission path 118 can include optical fibers 131c, 121c, which can be allocated as protection bandwidths of links 131, 121 in the A-B and B-C directions, for example. As shown in FIG. 3B and with reference to FIGS. 1A-1C, the second transmission path 128 can include optical fiber 111b, which can be allocated as the protection bandwidth of link 111 in the A-B direction, for example.

As shown in FIG. 3A and with reference to FIGS. 1A-1C, in this four-fiber exemplary embodiment, the first data transmission switch 115 can transmit data to the second data transmission switch 125 using the protection bandwidths of the first transmission path 118. As shown in FIG. 3B, based on detecting a failure condition in a protection bandwidth of the first transmission path 118, such as the protection bandwidth 121c in the B-C direction (i.e. the optical fiber 121a), the disclosed systems and methods can use the protection bandwidth 111b of the second different transmission path 128 to transmit the data otherwise transmitted using the protection bandwidth of the first transmission path 118.

Accordingly, described herein are systems and methods that employ protection bandwidths to transmit data using a first transmission path. When a failure condition is detected in the first transmission path, the data from the protection bandwidth of the first transmission path is transmitted using a second, different transmission path and, for example, the protection bandwidth(s) of the second, different transmission path. The disclosed methods and systems thus describe the utilization of protection bandwidths along a first transmission path, and when a failure condition occurs therein, subsequent data transmission can be effectuated by "freeing" and hence transmitting the first transmission path's protection bandwidth data using, for example, the protection bandwidth of a second, different transmission path.

The systems and methods described herein are not limited to a hardware or software configuration; they can find applicability in many computing or processing environments. The systems and methods can be implemented in hardware or software, or in a combination of hardware and software. The systems and methods can be implemented in one or more computer programs, in which a computer program can be understood to comprise one or more processor-executable instructions. The computer programs can execute on one or more programmable processors, and can be stored on one or more storage media readable by the processor, comprising volatile and non-volatile memory and/or storage elements.

The computer programs can be implemented in high level procedural or object oriented programming language to communicate with a computer system. The computer programs can also be implemented in assembly or machine language. The language can be compiled or interpreted. The computer programs can be stored on a storage medium or a device (e.g., compact disk (CD), digital video disk (DVD), magnetic disk, internal hard drive, external hard drive, random access memory (RAM), redundant array of independent disks (RAID), or removable memory device) that is readable by a general or special purpose programmable computer for configuring and operating the computer when the storage medium or device is read by the computer to perform the methods described herein.

While the systems and methods described herein have been shown and described with reference to the shown embodiments, those of ordinary skill in the art will recognize or be able to ascertain many equivalents to the embodiments described herein by using no more than routine experimentation. Such equivalents are intended to be encompassed by the scope of the present disclosure and the appended claims.

For example, those of ordinary skill in the art will understand that the data transmission systems and methods described herein are not limited to applications involving layer-1 or SONET redundancy schemes. The data transmission systems and methods described herein can be used in applications in which at least one portion of a network bandwidth is allocated to a redundancy scheme. The data transmission systems and methods described herein can be used with transport networks, such as, but not limited to, SONETs.

Also for example, those of ordinary skill in the art will understand that the data transmission systems and methods described herein are not limited to two or four optical-fiber configurations and can be used with optical-fiber configurations different than those described herein. The data transmission systems and methods described herein can be used with configurations based on one or more of bidirectional path switched rings (BPSRs), bidirectional line switched rings (BLSRs), linear protection systems, point-to-point 1+1 protection systems, and point-to-point 1:1 protection systems.

Accordingly, the appended claims are not to be limited to the embodiments described herein, can comprise practices other than those described, and are to be interpreted as broadly as allowed under prevailing law.

The invention claimed is:

1. A method for transmitting data between two nodes of a network, the method comprising:
   transmitting the data using a first protection bandwidth of a first transmission path between said two nodes, wherein the first transmission path comprises the first protection bandwidth and a first working bandwidth,
   detecting a failure condition in at least one of the first working bandwidth and the first protection bandwidth of the first transmission path, the failure condition including at least one of a line bit error rate and a path bit error rate that is greater than a signal degradation threshold, and
   based on detecting a failure condition in the first protection bandwidth of the first transmission path, using a second protection bandwidth of a different second transmission path between the two nodes to transmit the data previously transmitted using the first protection bandwidth of the first transmission path within a specified time period subsequent to the detected failure condition.

2. The method of claim 1, wherein the network comprises a transport network.

3. The method of claim 1, wherein the network comprises a synchronous optical network (SONET).

4. The method of claim 1, wherein the network comprises a configuration based on one or more of bidirectional path switched rings (BPSRs), bidirectional line switched rings (BLSRs), linear protection systems, point-to-point 1+1 protection systems, and point-to-point 1:1 protection systems.

5. The method of claim 1, wherein detecting a failure condition in the first transmission path is based on at least one of a layer-1 protocol and a non-layer-1 protocol.

6. The method of claim 5, wherein the layer-1 protocol comprises a SONET protocol.

7. The method of claim 5, wherein the non-layer-1 protocol comprises at least one of a layer-2 protocol and a layer-3 protocol.

8. The method of claim 5, wherein the non-layer-1 protocol comprises at least one of a multi-protocol label switching (MPLS) protocol and a resilient packet rings (RPR) protocol.

9. The method of claim 1, wherein detecting a failure condition in the first transmission path comprises:
detecting at least one of: a loss of a signal, a loss of a frame, and a line alarm.

10. The method of claim 1, wherein detecting the failure condition in the working bandwidth is based on at least one of a layer-1-protocol and a non-layer-1 protocol.

11. The method of claim 1, wherein detecting the failure condition in the protection bandwidth is based only on a non-layer-1 protocol.

12. The method of claim 1, further comprising:
determining the different second transmission path based on at least one non-layer-1 protocol.

13. The method of claim 12, wherein the at least one non-layer-1 protocol comprises at least one of a layer-2 protocol and a layer-3 protocol.

14. The method of claim 12, wherein the at least one non-layer-1 protocol comprises at least one of an MPLS protocol and an RPR protocol.

15. The method of claim 1, wherein the network comprises a configuration based on two optical fibers.

16. The method of claim 1, wherein the network comprises a configuration based on four optical fibers.

17. A processor program for transmitting data between two nodes of a network, the processor program stored on a non-transitory processor readable medium and comprising instructions to cause a processor to:
transmit data using a first protection bandwidth of a first transmission path between the two nodes, wherein the first transmission path comprises the first protection bandwidth and a first working bandwidth,
detect a failure condition in at least one of the first working bandwidth and the first protection bandwidth of the first transmission path, the failure condition including at least one of a line bit error rate and a path bit error rate that is greater than a signal degradation threshold, and
based on detecting a failure condition in the first protection bandwidth of the first transmission path, use a second protection bandwidth of a different second transmission path between the two nodes to transmit the data previously transmitted using the first protection bandwidth of the first transmission path within a specified time period subsequent to the detected failure condition.

18. The processor program of claim 17, wherein the network comprises a configuration based on one or more of bidirectional path switched rings (BPSRs), bidirectional line switched rings (BLSRs), linear protection systems, point-to-point 1+1 protection systems, and point-to-point 1:1 protection systems.

19. The processor program of claim 17, further comprising instructions to cause a processor to:
based on at least one of a layer-1 protocol and a non-layer-1 protocol, detect a failure condition in the first transmission path.

20. The processor program of claim 19, wherein the layer-1 protocol comprises a SONET protocol.

21. The processor program of claim 19, wherein the non-layer 1 protocol comprises at least one of a layer-2 protocol and a layer-3 protocol.

22. The processor program of claim 19, wherein the non-layer 1 protocol comprises at least one of a multi-protocol label switching (MPLS) protocol and a resilient packet rings (RPR) protocol.

23. The processor program of claim 17, further comprising instructions to cause a processor to:
determine the different second transmission path based on at least one non-layer-1 protocol.

24. The processor program of claim 23, wherein the at least one non-layer-1 protocol comprises at least one of a layer-2 protocol and a layer-3 protocol.

25. The processor program of claim 23, wherein the at least one non-layer-1 protocol comprises at least one of an MPLS protocol and an RPR protocol.

26. A system for transmitting data between two nodes of a network, the system comprising:
at least two switches connected to the network and configured to:
transmit data using a first protection bandwidth of a first transmission path between the two nodes, wherein the first transmission path comprises the first protection bandwidth and a first working bandwidth,
detect a failure condition in at least one of the first working bandwidth and the first protection bandwidth of the first transmission path, the failure condition including at least one of a line bit error rate and a path bit error rate that is greater than a signal degradation threshold, and
based on detecting a failure condition in the first protection bandwidth of the first transmission path, use a second protection bandwidth of a different second transmission path between the two nodes to transmit the data previously transmitted using the first protection bandwidth of the first transmission path within a specified time period subsequent to the detected failure condition.

27. The system of claim 26, wherein the network comprises a configuration based on one or more of bidirectional path switched rings (BPSRs), bidirectional line switched rings (BLSRs), linear protection systems, point-to-point 1+1 protection systems, and point-to-point 1:1 protection systems.

28. The system of claim 26, wherein the at least two switches are based on a non-layer-1 protocol.

29. The system of claim 28, wherein the non-layer-1 protocol comprises at least one of a layer-2 protocol and a layer-3 protocol.

30. The system of claim 28, wherein the non-layer-1 protocol comprises at least one of a multi-protocol label switching (MPLS) protocol and a resilient packet rings (RPR) protocol.

31. A network comprising: a synchronous optical network (SONET), and at least two data switches connected to the SONET and configured to:
transmit data using a first protection bandwidth of a first transmission path between the at least two switches, wherein the first transmission path comprises the first protection bandwidth and a first working bandwidth,
detect a failure condition in at least one of the first working bandwidth and the first protection bandwidth of the first transmission path, the failure condition including at least one of a line bit error rate and a path bit error rate that is greater than a signal degradation threshold, and
based on detecting a failure condition in the first protection bandwidth of the first transmission path, use a second protection bandwidth of a different second transmission path between the at least two switches to transmit the data previously transmitted using the first protection bandwidth of the first transmission path within a specified time period subsequent to the detected failure condition.

32. The network of claim 31, wherein the SONET comprises a configuration based on one or more of bidirectional path switched rings (BPSRs), bidirectional line switched rings (BLSRs), linear protection systems, point-to-point 1+1 protection systems, and point-to-point 1:1 protection systems.

33. The network of claim 31, wherein the at least two switches are based on a non-layer-1 protocol.

34. The network of claim 33, wherein the non-layer-1 protocol comprises at least one of a layer-2 protocol and a layer-3 protocol.

35. The network of claim 33, wherein the non-layer-1 protocol comprises at least one of a multi-protocol label switching (MPLS) protocol and a resilient packet rings (RPR) protocol.

* * * * *